(12) United States Patent
Mustafi

(10) Patent No.: US 11,347,733 B2
(45) Date of Patent: May 31, 2022

(54) SYSTEM AND METHOD FOR TRANSFORMING UNSTRUCTURED NUMERICAL INFORMATION INTO A STRUCTURED FORMAT

(71) Applicant: salesforce.com, inc., San Francisco, CA (US)

(72) Inventor: Joy Mustafi, Telangana (IN)

(73) Assignee: salesforce.com, inc., Dallas, TX (US)

(*) Notice: Subject to any disclaimer, the term of this patent is extended or adjusted under 35 U.S.C. 154(b) by 309 days.

(21) Appl. No.: 16/536,169

(22) Filed: Aug. 8, 2019

(65) Prior Publication Data
US 2021/0042307 A1 Feb. 11, 2021

(51) Int. Cl.
| | |
|---|---|
| *G06F 17/00* | (2019.01) |
| *G06F 16/2452* | (2019.01) |
| *G06F 16/28* | (2019.01) |
| *G06N 3/02* | (2006.01) |
| *G06N 5/04* | (2006.01) |
| *G06F 40/205* | (2020.01) |
| *G06F 40/289* | (2020.01) |
| *G06V 30/413* | (2022.01) |

(52) U.S. Cl.
CPC ...... *G06F 16/24522* (2019.01); *G06F 16/285* (2019.01); *G06F 40/205* (2020.01); *G06F 40/289* (2020.01); *G06N 3/02* (2013.01); *G06N 5/04* (2013.01); *G06V 30/413* (2022.01)

(58) Field of Classification Search
CPC ............. G06F 16/24522; G06F 40/205; G06F 40/289; G06F 16/285; G06F 16/2282; G06F 16/31; G06F 16/258; G06K 9/00456; G06K 9/6271; G06K 9/00469; G06N 3/02; G06N 5/04; G06N 3/08
See application file for complete search history.

(56) References Cited

U.S. PATENT DOCUMENTS

| | | |
|---|---|---|
| 7,730,478 B2 | 6/2010 | Weissman |
| 7,779,039 B2 | 8/2010 | Weissman et al. |
| 8,966,439 B2 | 2/2015 | Wolfram |
| 9,330,084 B1 | 5/2016 | Kadambi et al. |
| 9,430,557 B2 | 8/2016 | Bhat et al. |

(Continued)

FOREIGN PATENT DOCUMENTS

WO   WO 2013013173 A2   1/2013

OTHER PUBLICATIONS

Ha et al., Understanding Mathematical Expressions from Document Images, IEEE, 1995, pp. 956-959 (Year: 1995).*

(Continued)

*Primary Examiner* — Andrew T McIntosh
(74) *Attorney, Agent, or Firm* — Haynes and Boone, LLP

(57) ABSTRACT

Embodiments described herein automatically classifies numerical expressions from a textual document and designates a context to understand each numerical expression. Specifically, numerical expressions from a textual context are classified as nominal or cardinal. For cardinal numerical expressions that carry a quantitative meaning, inference terms are determined from the textual context to associate with the cardinal numerical expressions. The numerical expressions are then translated to a format of a numerical value and stored with metadata indicating the unit scale or the meaning of the numerical value.

20 Claims, 8 Drawing Sheets

(56) References Cited

U.S. PATENT DOCUMENTS

| | | | |
|---|---|---|---|
| 9,430,558 | B2 | 8/2016 | Bhat et al. |
| 9,460,075 | B2 | 10/2016 | Mungi et al. |
| 9,495,355 | B2 | 11/2016 | Mungi et al. |
| 9,514,185 | B2 | 12/2016 | Mungi et al. |
| 9,535,894 | B2 | 1/2017 | Carrier et al. |
| 9,613,091 | B2 | 4/2017 | Mungi et al. |
| 9,684,876 | B2 | 6/2017 | Agarwalla et al. |
| 9,916,303 | B2 | 3/2018 | Mungi et al. |
| 10,102,276 | B2 | 10/2018 | Joshi et al. |
| 10,133,732 | B2 | 11/2018 | Mungi et al. |
| 10,275,712 | B2 | 4/2019 | Bhat et al. |
| 10,275,713 | B2 | 4/2019 | Bhat et al. |
| 10,318,641 | B2 | 6/2019 | Mustafi et al. |
| 10,417,581 | B2 | 9/2019 | Agarwalla et al. |
| 10,426,551 | B2 | 10/2019 | Gupta et al. |
| 10,489,229 | B2 | 11/2019 | Mustafi et al. |
| 10,521,513 | B2 | 12/2019 | Mustafi et al. |
| 2005/0226512 | A1* | 10/2005 | Napper ............. G06K 9/00872 382/229 |
| 2008/0263403 | A1 | 10/2008 | Soklakov |
| 2010/0281350 | A1 | 11/2010 | Xie et al. |
| 2012/0065979 | A1* | 3/2012 | Wong ................... G10L 13/04 704/260 |
| 2013/0060774 | A1* | 3/2013 | Shepherd ........... G06Q 30/0271 707/737 |
| 2013/0304688 | A1 | 11/2013 | Osogami et al. |
| 2014/0250045 | A1 | 9/2014 | Bounouane et al. |
| 2014/0250047 | A1* | 9/2014 | Bounouane ............ G06N 7/005 706/52 |
| 2015/0331846 | A1 | 11/2015 | Guggilla et al. |
| 2016/0292153 | A1 | 10/2016 | Agarwalla et al. |
| 2017/0039192 | A1 | 2/2017 | Mustafi et al. |
| 2017/0039193 | A1 | 2/2017 | Mustafi et al. |
| 2017/0052985 | A1 | 2/2017 | Guggilla et al. |
| 2017/0052988 | A1 | 2/2017 | Guggilla et al. |
| 2018/0160894 | A1 | 6/2018 | Gupta et al. |
| 2019/0362265 | A1 | 11/2019 | Agarwalla et al. |

OTHER PUBLICATIONS

IBM Watson Analytics, retrieved from the internet, http://www.ibm.com/analytics/watson-analytics/ (1 page).

MS Excel: "Convert Numbers into words", retrieved from the internet, https://support.microsoft.com/en-us/kb/213360 (4 pages).

MS Azure Machine Learning, , retrieved from the internet, http://azure.microsoft.com/en-in/services/machine-learning/ (2 pages).

K. Morton et al., "A Novel Framework for Math Word Problem Solving," International Journal of Information and Education Technology, vol. 3, No. 1, Feb. 2013 (6 pages).

* cited by examiner

400

340

India's external debt, as at end-March 2009, was placed at US $ 229.9 billion (22.0 per cent of GDP) recording an increase of US $ 5.3 billion or 2.4 per cent over the level of the previous year mainly due to the increase in trade credits.

By way of composition of external debt, the share of commercial borrowings was the highest at 27.3 per cent as at end-March 2009 followed by short-term debt (21.5 per cent), NRI deposits (18.1 per cent) and multilateral debt (17.2 per cent).

410

| Document Meta data | India's external debt |
|---|---|
| Numerical Value | Metadata Information |
| 2009 | end March |
| 229900000000 | US $, billion |
| 22.0 | percent, GDP |
| 5300000000 | US $, billion, increase |
| 2.4 | percent, over previous year |
| 27.3 | percent, commercial borrowings |
| 2009 | end March |
| 21.5 | percent, short term debt |
| 18.1 | percent, NRI deposits |
| 17.2 | percent, multilateral debt |

SYSTEM AND METHOD FOR TRANSFORMING UNSTRUCTURED NUMERICAL INFORMATION INTO A STRUCTURED FORMAT

CROSS REFERENCE

The present disclosure is related to co-pending and commonly-owned U.S. application Ser. No. 16/536,172, filed on the same day, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to learning the contents of a document and more specifically to systems and methods for transforming unstructured numerical information into a structured relational data table.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A textual document (e.g., PDF, PPT, DOC) can often include numerical expression describing one or more named entities, but such textual description is often unstructured or semi-structured, lacking a direct understanding of the numerical expression. For example, existing systems can only determine numerical information that is compliant with a standard format from text, e.g., "12:30 PM" for time, "July $4^{th}$" or "Thursday" for date, "800-977-1000" for a telephone number. However, existing systems do not interpret the numerical expression by looking for a context in the text, and thus can often mis-identify numerical expressions from the text. For example, existing system may mis-identify a confirmation number "998223445" from a purchase receipt as a possible telephone number. For another example, when the numerical expressions are not in a pre-stored standard format, e.g., "the total revenue is 350M," existing systems can merely parse the numerical expression "350" and unit representation "M" from the text but does not provide an accurate interpretation of the numerical expression "350M" as meaning "350,000,000."

BRIEF DESCRIPTION OF THE DRAWINGS

FIG. 4 is a simplified diagram illustrating an operation on an input textual document to extract numerical information from the text by the numerical information extraction module shown in FIG. 3, according to embodiments described herein.

DETAILED DESCRIPTION

Figure 1:
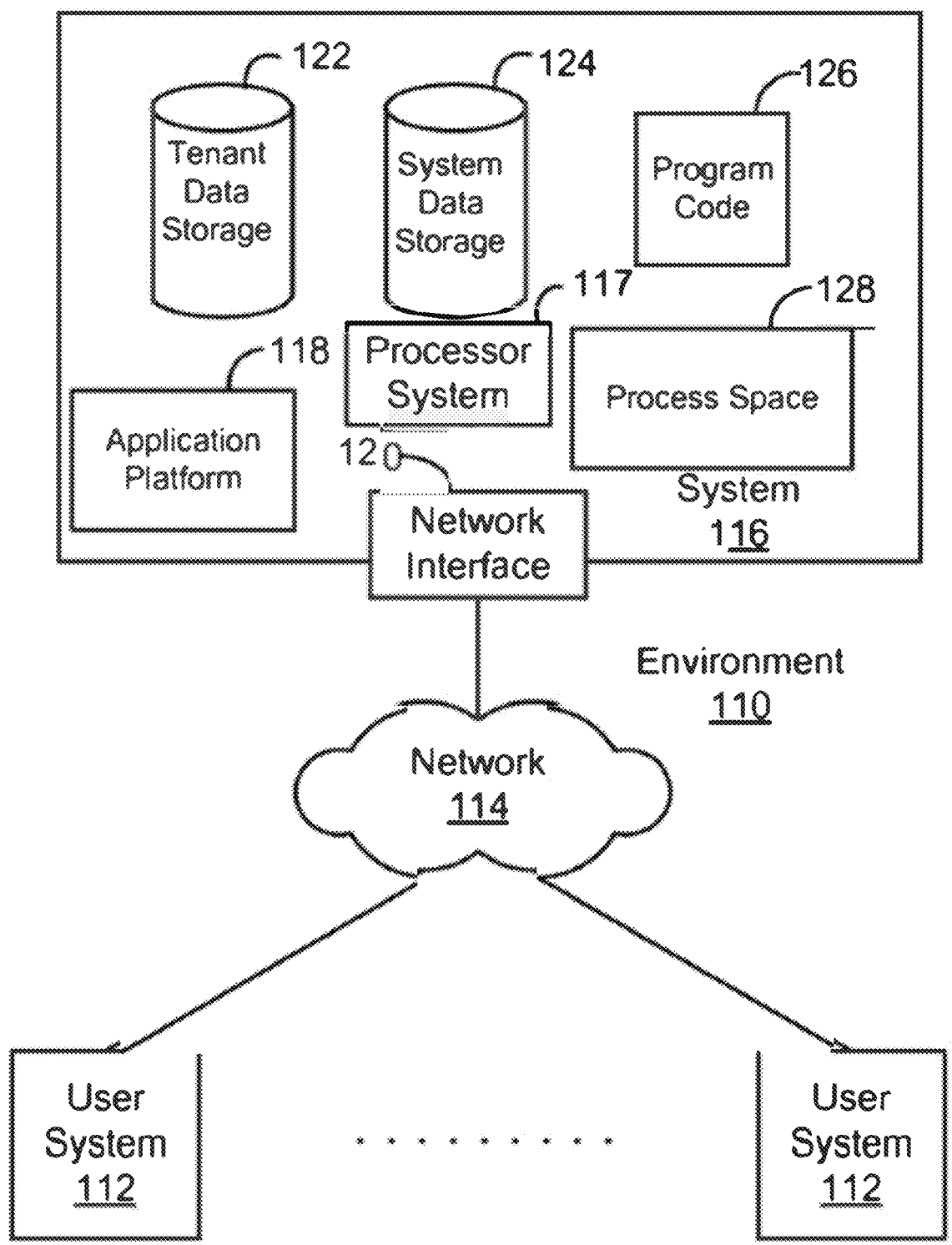
FIG. 1 illustrates a block diagram of an example environment wherein systems and methods for transforming unstructured numerical information into a structured relational data table may be provided and used according to some embodiments.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

In view of the need for transforming unstructured numerical expressions in a textual document into data values for storing in a structured relational data table, embodiments described herein automatically classifies numerical expressions from a textual document and designates a context to understand each numerical expression. Specifically, the system determines whether a number that appeared in the document is nominal or cardinal, e.g., "15% increase" is a cardinal expression while "version 1.1.2" is likely to be nominal. For cardinal numbers, the system classifies the numerical expression to the numerical value and metadata information associated with the numerical value, e.g., the context that indicates the meaning or the type of the numerical value. With respect to the prior example of "the total revenue is 350M," the numerical value "350" is associated with metadata information "revenue" and "M," which is to be interpreted as "million," and thus transformed into "350,000,000," based on an inference rule relating to the metadata "revenue." The system then determines a metric unit for the numerical value 350,000,000 based on the metadata of data, e.g., "revenue" corresponds to a data unit of "dollar." The transformed numerical expression can then be converted to a pre-defined format of a numerical value followed with a unit type and a meaning of the numerical value for storing in a tabular form.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
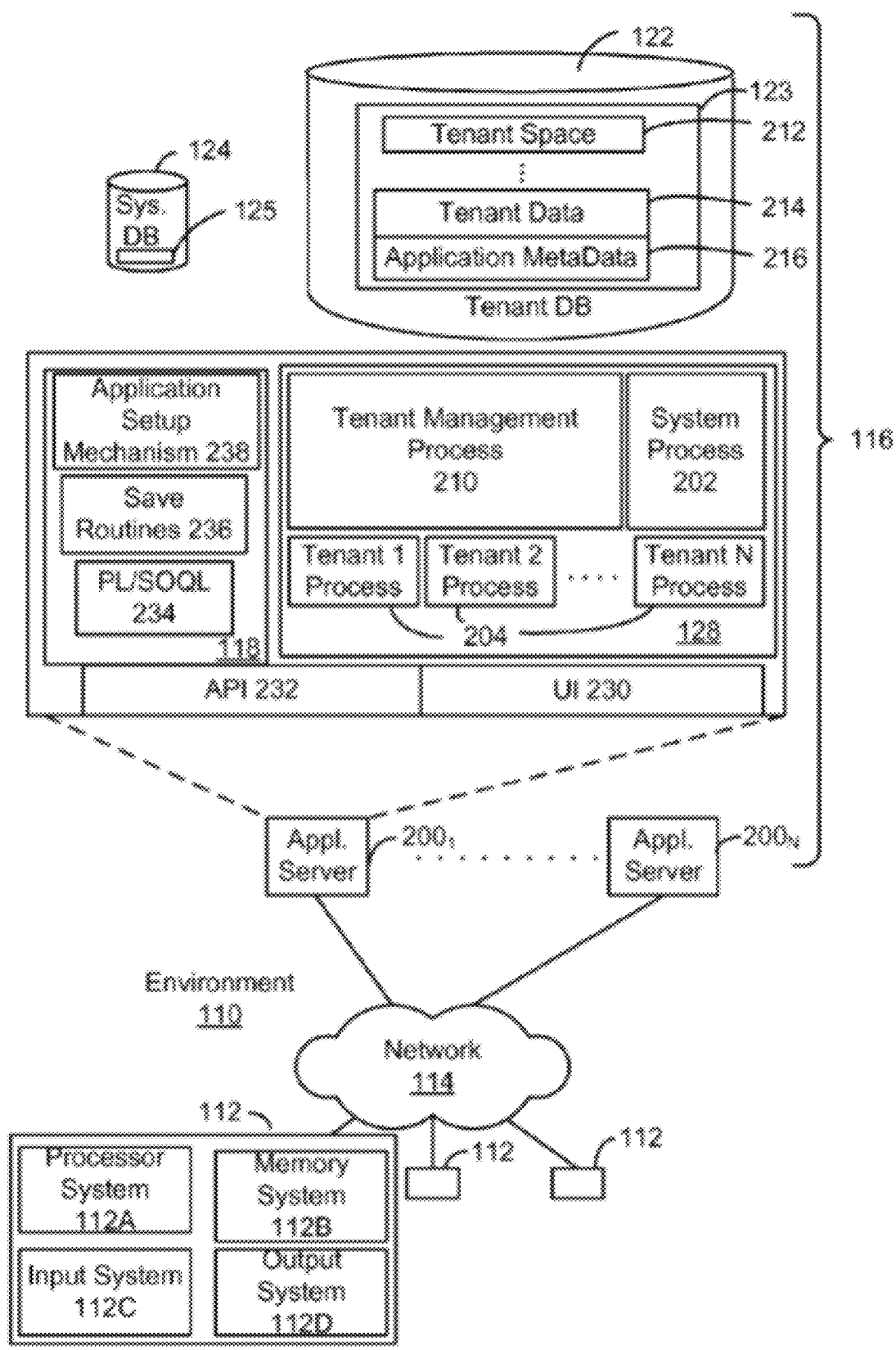
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP)

are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a table structuralizing module is provided for transforming an unstructured data table to a one-dimensional relational table. The table structuralizing module may be installed or implemented at a computing device shown in FIG. 3.

Figure 3:
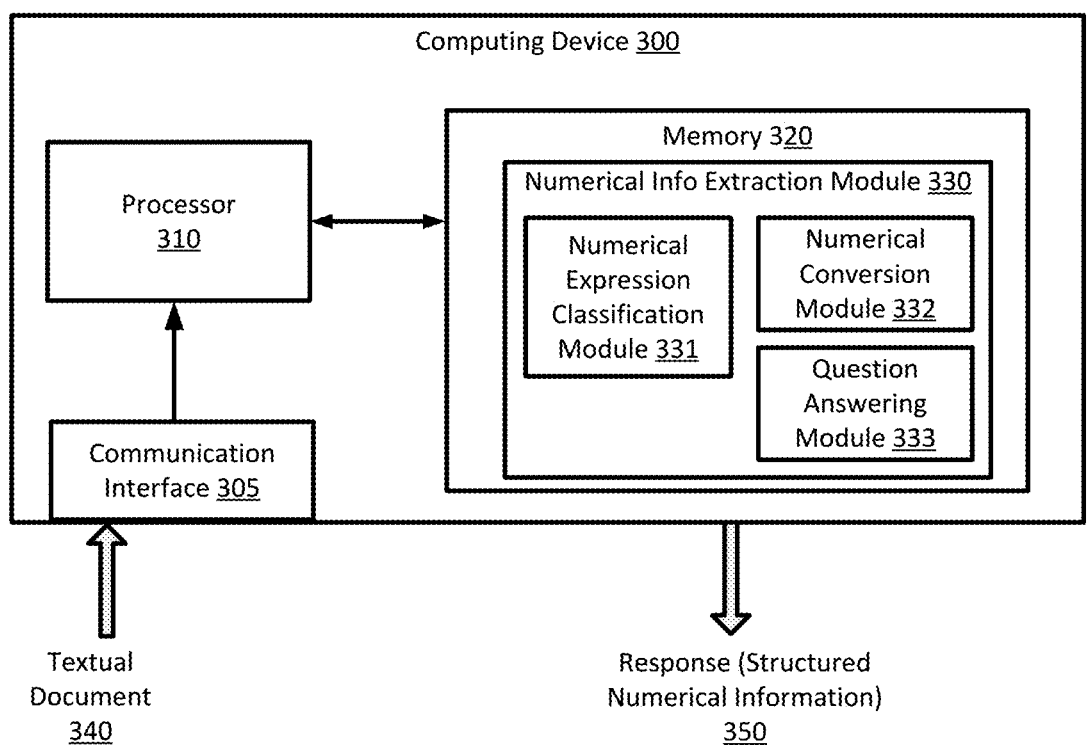
FIG. 3 is a simplified diagram of a computing device implementing numerical expression transformation, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a numerical information extraction module 330 for identifying unstructured numerical expressions from an input textual document 340 and translating the unstructured numerical expression into a structured format 350 suitable for storing in a structured relational database. For example, the input textual document 340 may be an editable document file, or an image file that includes one or more data tables. The numerical information extraction module 330 further includes sub-modules such as the numerical expression classification module 331, a numerical conversion module 332 and a question answering module 333. Specifically, the numerical expression classification module 331 is configured to identify an unstructured numerical expression from the input textual document 340 and classifies whether the unstructured numerical expression is cardinal or nominal, e.g., whether it carries quantitative meaning such as "350 million" or it is a nominal expression such as a version number. The numerical conversion module 332 is configured to analyze the context of the numerical expression and transform the unstructured numerical expression into a data value and metadata indicating the meaning of the data value for storage at a relational database. In some implementations, the question answering module 333 may generate an answer to a natural language question based on the converted data values and the metadata. For example, the question answering module 333 may generate a response to a natural language question based on relational data tables that store the converted data values, which can be similar to embodiments described in co-pending and commonly-owned U.S. application Ser. No. 16/536,172, filed on the same day. Further details on operations of the numerical expression classification module 331, numerical conversion module 332 and the question answering module 333 are further described in relation to FIGS. 4-8.

After implementing and executing the numerical information extraction module 330, in some embodiments, the output response 350 containing structured numerical information can be global for the multi-tenant database system, such as system 116, and applied to or used for all organizations or tenants whose users or customers utilize system 116 for data object generation, management, and use. Computing device 300 may receive or intake the input textual document 340 from a user of an organization or tenant accessing the database system. The input textual document 340 of unstructured numerical expressions can be any type data in that it can take the form of an editable document file such as a PDF or a DOC file, an image file, and the like. In some embodiments, the input textual document 340 is not constrained, restricted, or required to be in a particular form.

Computing device 300 can receive the textual document 340 through a user interface, a communication interface 305 via a communication network, and/or the like.

FIG. 4 is a simplified diagram 400 illustrating an operation on an input textual document to extract numerical information from the text by the numerical information extraction module 330 shown in FIG. 3, according to embodiments described herein. Diagram 400 shows an example textual document 340 which includes paragraphs of text that contains multiple numerical expressions, such as "2009," "$222.0 billion," "22.0," etc.

In some embodiments, the numerical expression classification module 331 may identify and classify all numerical expressions. For example, each numerical expression may be classified into one of the categories: numerals (e.g., a decimal number such as 555, −273, 3.141, etc., a roman number such as VII, VIII, IX, etc., a hexadecimal number such as FF etc.), word numbers (e.g., word description such as "fifty thousand" etc., numerals and words such as "50 thousand," numbers with special characters such as "five thousand and fifty" with the special character "and," "twenty-five" with the special character "-," "10,000,000" with the commas "," etc.), special words (e.g., dozen, couple, etc.), time words (e.g., millennium, century, fortnight, half a day, etc.), rank words (e.g., first, $10^{th}$, etc.), multipliers (e.g., twice, ten times, half, one-third, etc.), units (e.g., 0.5 kilometer, 500 meters, 100 miles, etc.), currencies (e.g., dollar, USD, $, etc.), and/or the like. For another example, the numerical expression is also classified into nominal categories, e.g., when the numerical information does not indicate any quantitative meaning. The nominal classification may include an index (e.g., "X[10]," etc.), bullet point (e.g., "1.2.1 . . . "), reference (e.g., "as described in [12], . . . " etc.), subsection (e.g., "Chapter VII," etc.), abbreviation (e.g., "3GPP," etc.), phone/confirmation number (e.g., "9886392439," etc.), address/zip number (e.g., "525 University Avenue," "94063," etc.), and/or the like.

The classified numerical expression may then be organized into two columns, the numerical values 415 and the metadata information 420. Namely, each numerical expression is split into a numerical portion and a non-numerical portion, wherein the non-numerical portion may be extracted or derived from the context of the portion of text where the numerical expression is identified. Referred to as the "metadata information" at column 420, the non-numerical portion contains information indicative of the meaning of the numerical value 415, such as the units, quantity, entity to be described, etc.

In some embodiments, the numerical information extraction module 330 may further extract document metadata 410 from the input textual document 340, e.g., document title, document name, section sub-title, caption of data table if there is any, etc. In some embodiments, the numerical information extraction module 330 may analyze the sentence structure of the paragraphs and extract key terms from a topic sentence as relevant metadata, e.g., "Indian's external debt" in the first sentence of the first paragraph of textual document 340.

Figure 5:
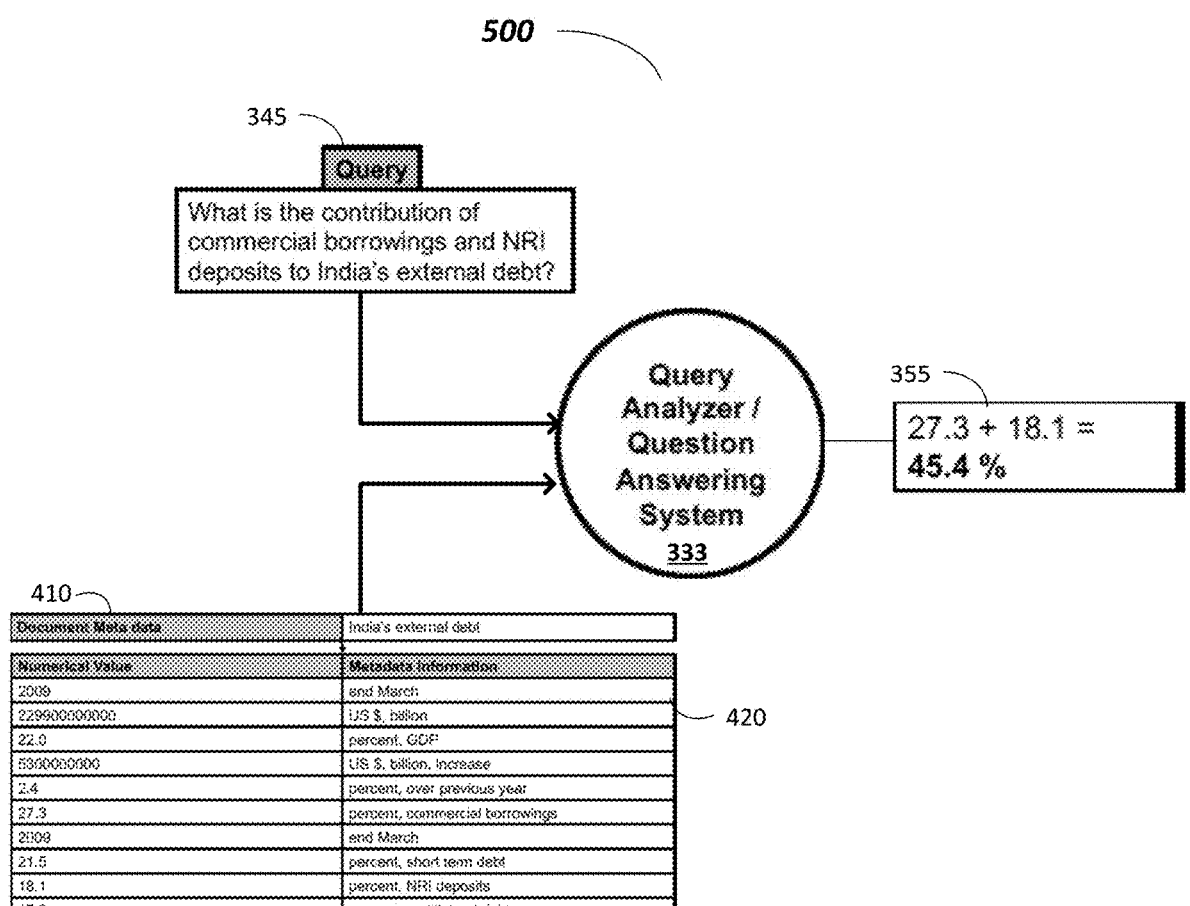
FIG. 5 is a simplified diagram illustrating an operation by the question answering module to process a query based on the extracted numerical values shown in FIG. 4, according to embodiments described herein.

FIG. 5 is a simplified diagram 500 illustrating an operation by the question answering module 333 to process a query based on the extracted numerical values 415 shown in FIG. 4, according to embodiments described herein. For example, the question answering module 333 may receive a natural language query 345, e.g., "what is the contribution of commercial borrowings and NRI deposits to India's external debt?" The natural language query 345 may be received via the communication interface 305 shown in FIG. 3.

The question answering module 333 may first identify key terms from the natural language question 345, e.g., "contribution," "commercial borrowings," "and", "NRI deposits," "to," "India's external debts," etc. The question answering module 333 may further identify a match between the key term "India's external debts" from the natural language query 345 with the document metadata 410, which identifies a data source for the possible answer to the question, e.g., the input document with the metadata key term "India's external debts." The question answering module 333 then retrieves the numerical values 415 and the identified metadata information 420 associated with the numerical values 415 from the input textual document 340, based on which the key terms from the natural language query 345 may be classified. For example, the key term "commercial borrowings" from query 345 may be mapped to the metadata entry containing "commercial borrowings" which corresponds to a data value of "27.3," and the key term "NRI deposits" may be mapped to the metadata entry containing "NRI deposits" which corresponds to a data value of 18.1. The metadata entries also indicate that the unit for the numerical values "27.3" and "18.1" are "percent." An operation type may also be determined based on the connecting term "and" in the natural language query 345 as an "addition" operation. Therefore, the question answering module 333 may compute a total "percent" as the sum of the two numerical values, e.g., 27.3+18.1=45.4. The question answering module 333 may output an answer 355 of "45.5%."

Figure 6:
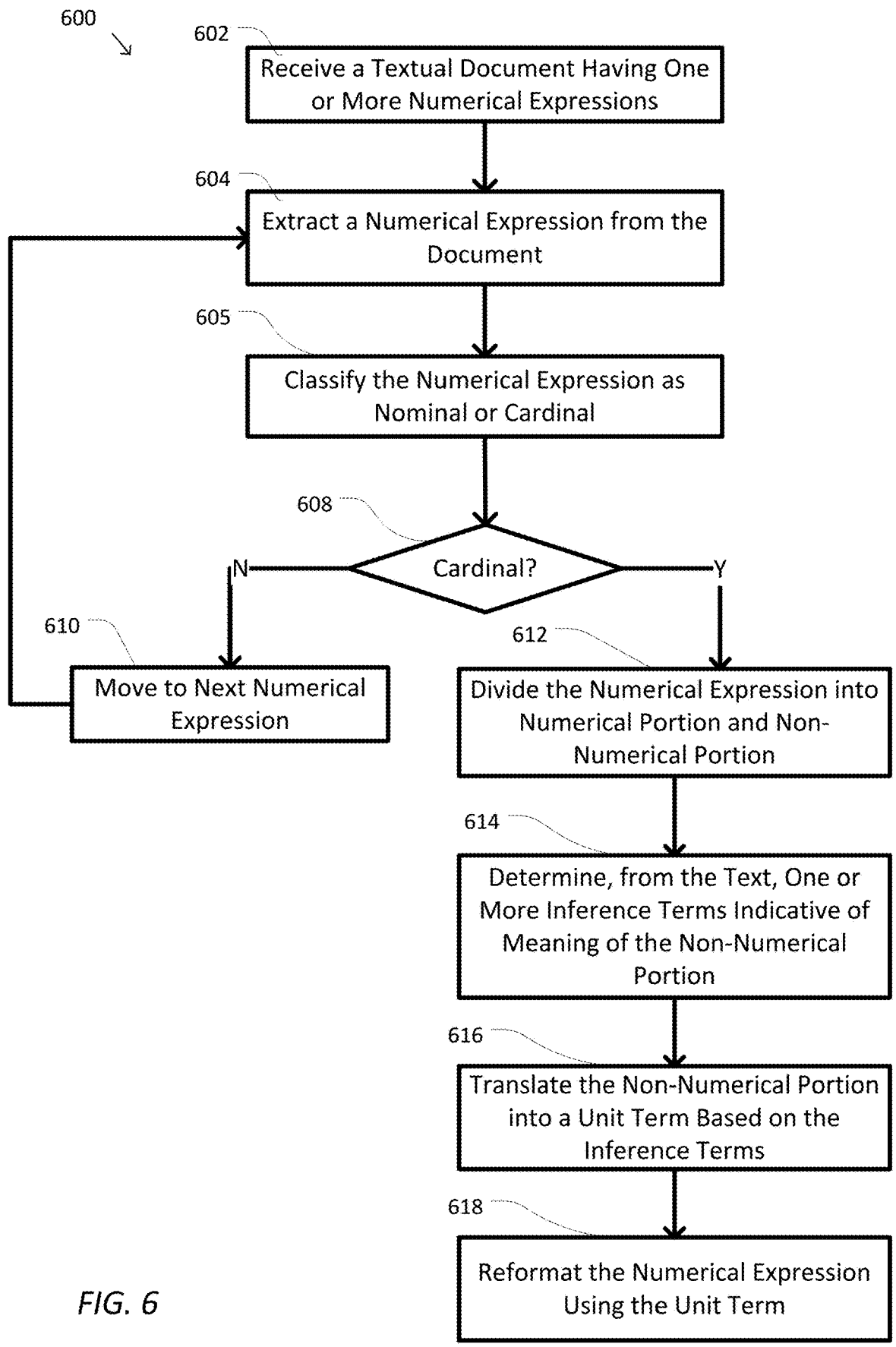
FIG. 6 is a simplified logic flow diagram illustrating a method of operating the numerical expression extraction module shown in FIG. 3 to unstructured numerical expressions from a text document to structured data entries, according to some embodiments.

FIG. 6 is a simplified logic flow diagram illustrating a method 600 of operating the numerical expression extraction module 330 shown in FIG. 3 to unstructured numerical expressions from a text document to structured data entries, according to some embodiments. The example method 600 including processes 602-618 in FIG. 6 may be implemented, at least in part, in the form of executable code stored on non-transitory, tangible, machine-readable media that when run by one or more processors may cause the one or more processors to perform one or more of the processes 602-618. In some embodiments, these processes may correspond to the method used by the numerical expression extraction module 330 to transform unstructured numerical expressions to structured data entries.

Method 600 starts at process 602, at which a textual document having one or more numerical expressions is received, e.g., the input document 340 may be received via a communication interface 305. At process 604, a numerical expression is identified and extracted from the textual document. For example, as shown at 340 in FIG. 4, a numerical expression can take a form of a numeral number (e.g., "2009," "229.9", etc.) or a word description (e.g., "March," "percent," etc.). Various numerical expressions of different formats, as discussed in relation to FIG. 4, may be identified from the textual document.

At process 605, the extracted numerical expression is classified as nominal or cardinal. Method 600 may extract a set of words containing the numerical expression from the textual document and determine a probability that the set of words fit into a nominal expression pattern category. The probability may then be used to determine whether the numerical expression is nominal. For example, as discussed in relation to FIG. 4, a nominal numerical expression includes categories of indices, section numbers, phone numbers, etc., and a cardinal numerical expression may take a format of numerals, word numbers, special words, time words, etc.

At process 608, when the numerical expression is classified as a nominal expression, method 600 proceeds to process 610, at which method 600 moves to the next numerical expression in the textual document and repeats from process 604.

When the numerical expression is classified as a cardinal expression at process 608, method 600 proceeds to process 612, at which the numerical expression is divided into a numerical portion and a non-numerical portion. For example, the numerical expression "229.9 million" is divided into the numerical value "229.9" and the unit "million."

At process 614, method 600 determines, from the textual document, one or more inference terms indicative of the meaning of the non-numerical portion. For example, terms such as "US," "external debt" from the original context where the numerical expression "229.9 billion" may be selected as inference terms for the numerical expression. Further details of process 614 are described in relation to FIG. 8.

At process 616, the non-numerical portion is translated into a unit term based on the inference terms. For example, method 600 may query a unit scale database based on the one or more inference terms to obtain the unit term, e.g., when the inference term is "debt," "U.S." a unit term of "US dollar" may be obtained.

At process 618, the numerical expression is reformatted using the unit term. For example, the numerical portion of the numerical expression may be translated to a standard format, e.g., "229.9 million" is translated to the numerical value "229,900,000." The inference terms identified for the numerical expression may be stored as the metadata associated with the numerical expression. In some embodiments, the reformatted numerical expression may be stored at a relational database. For example, a header name may be determined based on the classified words from the context of the textual document that contain quantitative meaning and the inference terms, e.g., a header name of "debt" may be determined for the numerical expression "229.9 million" which is associated with the metadata "India's external debt." The reformatted numerical expression may then be stored under the header name in a tabular form. The inference terms may be associated with the reformatted numerical expression in the tabular form, e.g., as shown at columns 415 and 420 in FIG. 4.

Figure 7:
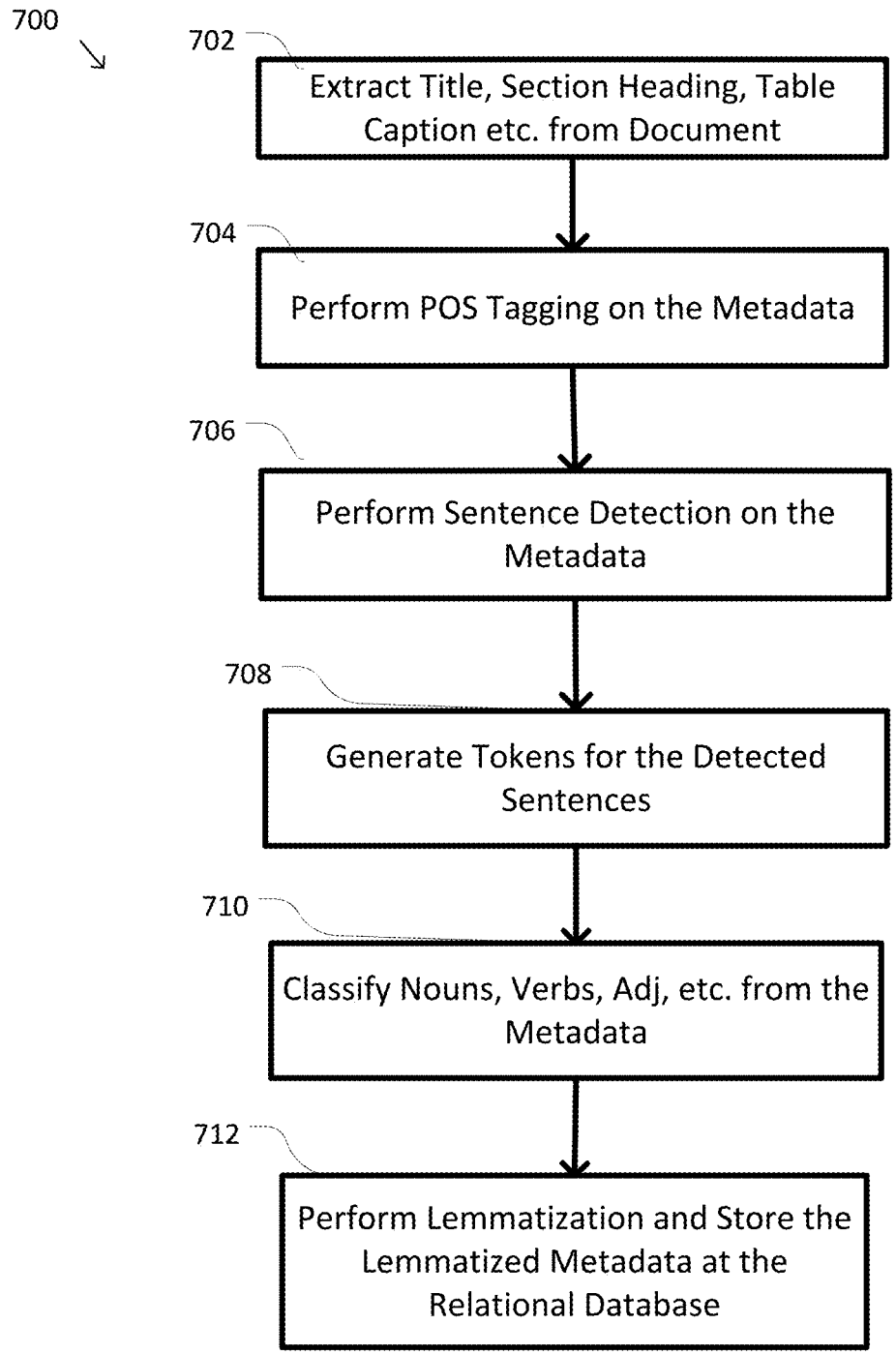
FIG. 7 is a simplified logic flow diagram illustrating method to extract document metadata as supplemental information to the extracted numerical expression from the document, according to some embodiments.

FIG. 7 is a simplified logic flow diagram illustrating method 700 to extract document metadata as supplemental information to the extracted numerical expression from the document, according to some embodiments. The example method 700 including processes 702-712 in FIG. 7 may be implemented, at least in part, in the form of executable code stored on non-transitory, tangible, machine-readable media that when run by one or more processors may cause the one or more processors to perform one or more of the processes 702-712. In some embodiments, these processes may correspond to the method used by the numerical expression extraction module 330 to extract metadata for the numerical expressions.

At process 702, metadata associated with the input textual document (e.g., 340 in FIG. 3) such as document name, title, section heading, table caption, etc. may be extracted. At sub-process 704, the numerical expression extraction module 330 may perform part-of-speech (POS) tagging on the metadata and/or the text in the textual document. For example, one or more words in the text surrounding each numerical expression may be classified, e.g., identifying the relationship with adjacent and related words in the phrase, sentence or the paragraph, to indicate the context of the numerical expression. At process 706, sentence detection may be performed on the metadata or the text surrounding the tabular structure, and tokens of the detected sentences may be generated at process 708 to further establish the context of the numerical expressions. At process 710, words from the sentence are classified into nouns, verbs, adjectives, etc., to further establish the context of the numerical expressions. At process 712, lemmatization may be performed on the identified nouns, verbs, adjustives, etc., by vocabulary and morphological analysis, and the lemmatization data is stored with the metadata at a relational database.

Figure 8:
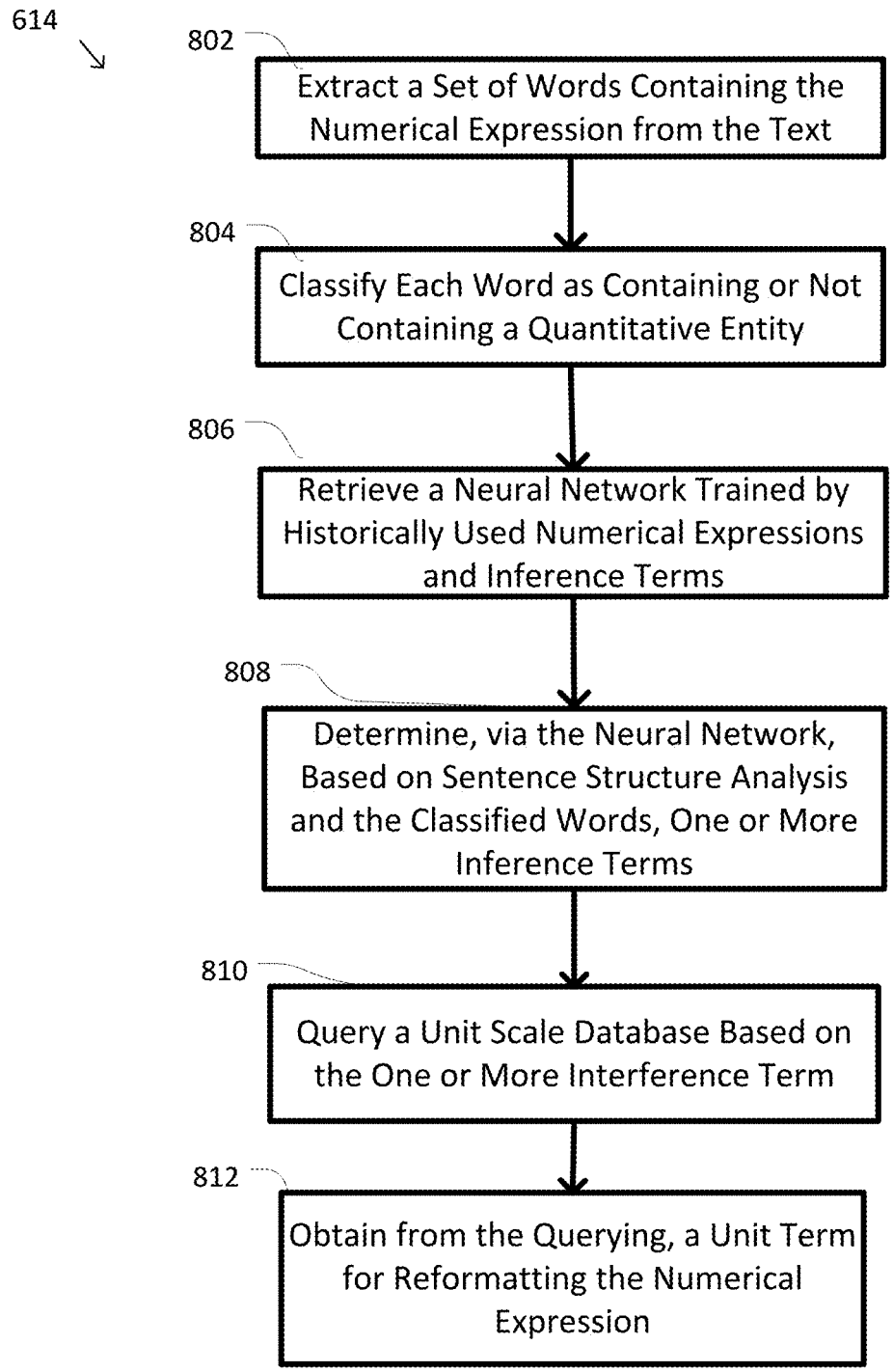
FIG. 8 is a simplified logic flow diagram illustrating process shown in FIG. 6 to determine one or more inference terms indicative of the meaning of the numerical values, according to some embodiments.

FIG. 8 is a simplified logic flow diagram illustrating process 614 shown in FIG. 6 to determine one or more inference terms indicative of the meaning of the numerical values, according to some embodiments. The example process 614 including sub-processes 802-812 in FIG. 8 may be implemented, at least in part, in the form of executable code stored on non-transitory, tangible, machine-readable media that when run by one or more processors may cause the one or more processors to perform one or more of the sub-processes 802-812. In some embodiments, these processes may correspond to the method used by the numerical conversion module 332 to identify the meaning of the numerical expressions.

At sub-process 802, a set of words are extracted from the text. The set of words usually contains the numerical expression. For example, the set of words "external debt," "end-March 2009," "placed," "US," "22.0 percent" "GDP" etc. may be extracted from the text as the context of the numerical expression "229.9 million."

At sub-process 804, each word from the set of words is classified as containing or not containing quantitative meaning. For example, the words "debt," "GDP" etc. contain a quantitative meaning, while the words "placed," "US," etc. do not contain any quantitative meaning.

At sub-process 806, a neural network trained by historically used numerical expressions and inference terms may be retrieved. At sub-process 808, the neural network is used to determine, based on sentence structure analysis and the classified words that contain quantitative meaning, the one or more inference terms indicative of the meaning of the non-numerical portion. In some embodiments, the classified words that contain quantitative meaning may be associated with a particular numerical expression based on a distance therebetween in the original text. For instance, as shown at text 340 in FIG. 4, words such as "debt" and "GDP" that have quantitative inference meaning are considered to be the closest to the numerical expression "229.9 million" in the original text. Another numerical expression, "22.0 percent," however, is closer to the word "GDP" than the numerical expression "229.9 million." Thus, "GDP" is considered to be related to the numerical expression "22.0 percent" instead of "229.9 million," and the numerical expression "229.9 million" is thus assigned the word "external debt" as an inference term.

At sub-process 810, upon determining the inference terms, a unit scale data base may be queries based on the inference terms. For example, for the numerical expression "229.9 million," which is paired with an inference term "external debt," a currency unit term "USD" or "US dollar" may be assigned based on the context of the numerical expression "US $229.9 million." At sub-process 812, the unit term may be used to reformat the numerical expression, as described at process 618.

Some examples of computing devices, such as computing device 300, may include non-transitory, tangible, machine readable media that include executable code that when run by one or more processors (e.g., processor 310) may cause the one or more processors to perform the processes of method 800. Some common forms of machine readable media that may include the processes and sub-processes of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and, in a manner, consistent with the scope of the embodiments disclosed herein.

What is claimed is:

1. A system for transforming unstructured numerical expressions from a text document to structured data entries, the system comprising:
    a communication interface that receives the textual document having one or more numerical expressions;
    a memory containing machine readable medium storing machine executable code; and
    one or more processors coupled to the memory and configurable to execute the machine executable code to cause the one or more processors to:
        extract a numerical expression from the textual document;
        classify the numerical expression as nominal or cardinal;
        when the numerical expression is classified as cardinal:
            divide the numerical expression into a numerical portion and a non-numerical portion;
            determine, from a text where the numerical expression is extracted from, one or more inference terms indicative of a meaning of the non-numerical portion;
            translate the non-numerical portion into a unit term based on the one or more inference terms;
            reformat the numerical portion of the numerical expression using the unit term; and
            store the reformatted numerical expression and the metadata associated with the reformatted numerical expression, with the one or more inference terms in a relational database.

2. The system of claim 1, wherein the one or more processors is configurable to execute the machine executable code to classify the numerical expression as nominal or cardinal by:
    extracting a set of words containing the numerical expression from the textual document;
    determining a probability that the set of words fit into a nominal expression pattern; and
    determining whether the numerical expression is nominal based on the determined probability.

3. The system of claim 2, wherein the nominal expression pattern includes any of an index, a bullet point, a reference number, a section number, an abbreviation, a telephone number, or an address number.

4. The system of claim 1, wherein one or more processors is configurable to execute the machine executable code to determine, from a text where the numerical expression is extracted from, one or more inference terms indicative of a meaning of the non-numerical portion by:
    extracting a set of words from the text, the set of words containing the numerical expression;
    classifying each word from the set of words as containing or not containing quantitative meaning; and
    determining, based on sentence structure analysis and the classified words that contain quantitative meaning, the one or more inference terms indicative of the meaning of the non-numerical portion.

5. The system of claim 4, wherein the one or more processors is configurable to execute the machine executable code further to:
    retrieving a neural network trained by historically used numerical expressions and inference terms; and
    determining the one or more inference terms via the neural network.

6. The system of claim 5, wherein the one or more processors is configurable to execute the machine executable code to translate the non-numerical portion into a unit term based on the one or more inference terms by:
    querying a unit scale database based on the one or more inference terms; and
    obtaining, from the querying, the unit term.

7. The system of claim 4, wherein the one or more processors is configurable to execute the machine executable code to store the reformatted numerical expression with the one or more inference terms in a relational table by:
    determining a header name based on the classified words that contain quantitative meaning and the one or more inference terms;
    storing the reformatted numerical expression under the header name in a tabular form; and
    associating the one or more inference terms with the reformatted numerical expression in the tabular form.

8. The system of claim 1, wherein the one or more processors is further configurable to execute the machine executable code to:
    extract metadata relating to the numerical expression from the textual document;
    organize the metadata into a metadata format; and
    store the metadata with the reformatted numerical expression in the relational table.

9. The system of claim 1, wherein the one or more processors is configurable to execute the machine executable code further to:
    receive a natural language query; and
    identify related numerical expressions and associated inference terms pertaining to the natural language query.

10. The system of claim 9, wherein the one or more processors is configurable to execute the machine executable code further to:
    determine an operation type relating to the natural language query and the identified related numerical expressions and associated inference terms;
    perform an operation of the operation type over the identified related numerical expressions;
    obtain a numerical result from the operation; and
    present the numerical result in a natural language format.

11. A method for transforming unstructured numerical expressions from a text document to structured data entries, the method comprising:

receiving, via a communication interface, the textual document having one or more numerical expressions;

extracting, via a processor, a numerical expression from the textual document;

classifying the numerical expression as nominal or cardinal;

when the numerical expression is classified as cardinal:
dividing the numerical expression into a numerical portion and a non-numerical portion;

determining, from a text where the numerical expression is extracted from, one or more inference terms indicative of a meaning of the non-numerical portion;

translating the non-numerical portion into a unit term based on the one or more inference terms;

reformatting the numerical portion of the numerical expression using the unit term; and storing the reformatted numerical expression and the metadata associated with the reformatted numerical expression, with the one or more inference terms in a relational database.

12. The method of claim 11, wherein the classifying the numerical expression as nominal or cardinal comprises:

extracting a set of words containing the numerical expression from the textual document;

determining a probability that the set of words fit into a nominal expression pattern; and determining whether the numerical expression is nominal based on the determined probability.

13. The method of claim 12, wherein the nominal expression pattern includes any of an index, a bullet point, a reference number, a section number, an abbreviation, a telephone number, or an address number.

14. The method of claim 11, wherein the determining, from a text where the numerical expression is extracted from, one or more inference terms indicative of a meaning of the non-numerical portion comprises:

extracting a set of words from the text, the set of words containing the numerical expression;

classifying each word from the set of words as containing or not containing quantitative meaning; and determining, based on sentence structure analysis and the classified words that contain quantitative meaning, the one or more inference terms indicative of the meaning of the non-numerical portion.

15. The method of claim 14, further comprising:

retrieving a neural network trained by historically used numerical expressions and inference terms; and determining the one or more inference terms via the neural network.

16. The method of claim 15, wherein the translating the non-numerical portion into a unit term based on the one or more inference terms comprises:

querying a unit scale database based on the one or more inference terms; and obtaining, from the querying, the unit term.

17. The method of claim 14, wherein the storing the reformatted numerical expression with the one or more inference terms in the relational table comprises:

determining a header name based on the classified words that contain quantitative meaning and the one or more inference terms;

storing the reformatted numerical expression under the header name in a tabular form; and associating the one or more inference terms with the reformatted numerical expression in the tabular form.

18. The method of claim 11, further comprising:

extracting metadata relating to the numerical expression from the textual document;

organizing the metadata into a metadata format; and storing the metadata with the reformatted numerical expression in the relational table.

19. The method of claim 11, further comprising:

receiving a natural language query; and identifying related numerical expressions and associated inference terms pertaining to the natural language query.

20. The method of claim 19, further comprising:

determining an operation type relating to the natural language query and the identified related numerical expressions and associated inference terms;

performing an operation of the operation type over the identified related numerical expressions;

obtaining a numerical result from the operation; and presenting the numerical result in a natural language format.

* * * * *